United States Patent
Liu et al.

(10) Patent No.: US 11,651,614 B2
(45) Date of Patent: May 16, 2023

(54) PIXEL DRIVING CIRCUIT, DRIVING METHOD THEREOF AND DISPLAY PANEL

(71) Applicants: Chengdu BOE Optoelectronics Technology Co., Ltd., Sichuan (CN); BOE Technology Group Co., Ltd., Beijing (CN)

(72) Inventors: Ke Liu, Beijing (CN); Ling Shi, Beijing (CN); Yang Yu, Beijing (CN); Bingqiang Gui, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 85 days.

(21) Appl. No.: 17/431,437

(22) PCT Filed: Feb. 24, 2021

(86) PCT No.: PCT/CN2021/077574
§ 371 (c)(1),
(2) Date: Aug. 17, 2021

(87) PCT Pub. No.: WO2021/212996
PCT Pub. Date: Oct. 28, 2021

(65) Prior Publication Data
US 2022/0309821 A1    Sep. 29, 2022

(30) Foreign Application Priority Data
Apr. 23, 2020   (CN) .......................... 202010325461.1

(51) Int. Cl.
*G06V 40/13*    (2022.01)
*G09G 3/3275*   (2016.01)

(52) U.S. Cl.
CPC ....... *G06V 40/1306* (2022.01); *G09G 3/3275* (2013.01); *G09G 2300/0426* (2013.01); *G09G 2330/028* (2013.01); *G09G 2354/00* (2013.01)

(58) Field of Classification Search
CPC .... G06V 40/1306; G09G 3/20; G09G 3/3225; G09G 3/3233; G09G 3/3275;
(Continued)

(56) References Cited

U.S. PATENT DOCUMENTS

| 11,151,937 B2 | 10/2021 | Liu et al. |
| 2019/0197281 A1 | 6/2019 | Choi et al. |
| 2021/0366395 A1 | 11/2021 | Yang et al. |

FOREIGN PATENT DOCUMENTS

| CN | 108682386 A | 10/2018 |
| CN | 108806587 A | 11/2018 |

(Continued)

OTHER PUBLICATIONS

International Search Report for PCT/CN2021/077574 dated Jun. 2, 2021.
(Continued)

*Primary Examiner* — Nelson M Rosario
(74) *Attorney, Agent, or Firm* — Ling Wu; Stephen Yang; Ling and Yang Intellectual Property

(57) ABSTRACT

Provided are a pixel driving circuit, a driving method thereof and a display panel. The pixel driving circuit includes a pixel driving module, an ultrasonic driving unit, an ultrasonic sensing unit and a signal acquisition unit. The pixel driving module is configured to drive a light-emitting unit to emit light; the ultrasonic driving unit is configured to provide a signal of a second signal terminal to a first node under control of the second signal terminal; the ultrasonic sensing unit is configured to transmit ultrasonic waves according to signals of the first node and a third power supply terminal, (Continued)

receive reflected ultrasonic echoes and generate a first induction signal at the first node; the signal acquisition unit is configured to output a second induction signal to an output terminal according to a first power supply terminal and first induction signal of the first node under control of the first node.

15 Claims, 12 Drawing Sheets

(58) Field of Classification Search
CPC ... G09G 2300/0426; G09G 2300/0819; G09G 2300/0842; G09G 2300/0852; G09G 2300/0861; G09G 2320/0238; G09G 2330/028; G09G 2354/00
See application file for complete search history.

(56) References Cited

FOREIGN PATENT DOCUMENTS

| | | |
|---|---|---|
| CN | 208521297 U | 2/2019 |
| CN | 109872683 A | 6/2019 |
| CN | 110008939 A | 7/2019 |
| CN | 110058718 A | 7/2019 |
| CN | 110214350 A | 9/2019 |
| CN | 110767161 A | 2/2020 |
| CN | 111508413 A | 8/2020 |
| WO | 2019055215 A2 | 3/2019 |

OTHER PUBLICATIONS

Office Action dated Aug. 5, 2021 for Chinese Patent Application No. 202010325461.1 and English Translation.

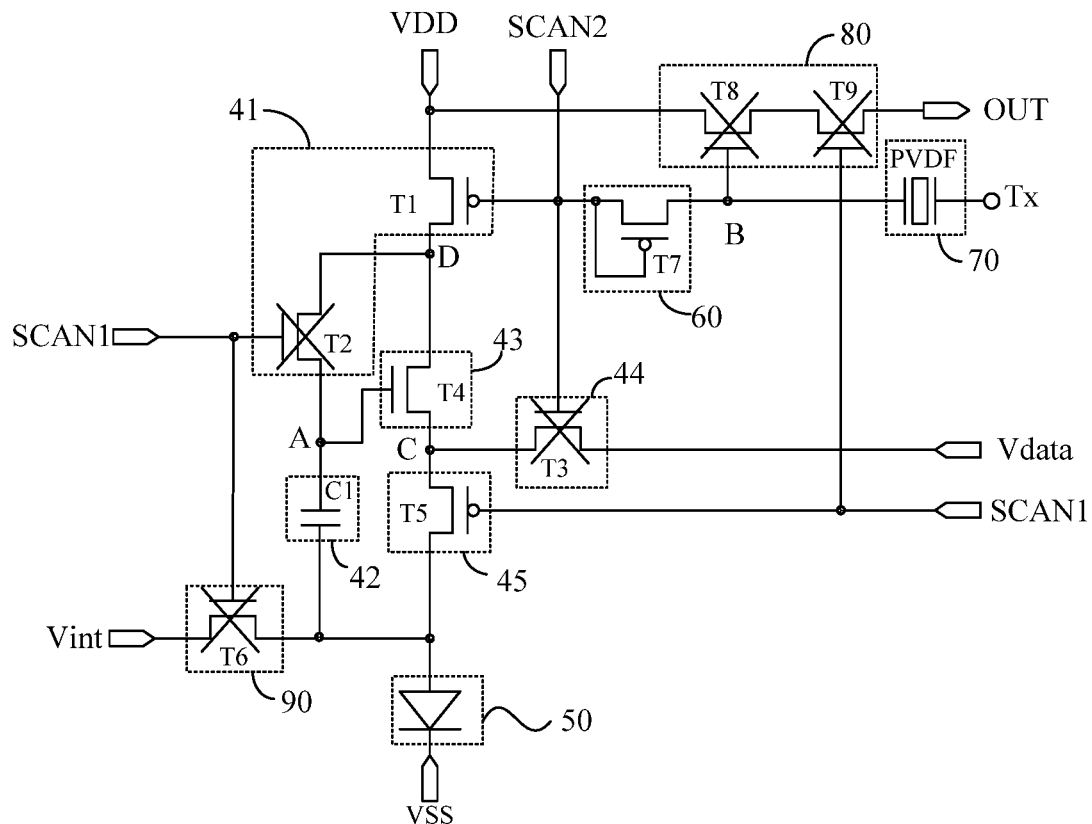

FIG. 17

In a first stage, provide a signal of a first power supply terminal to a second node, provide a signal of a second signal terminal to a first node, and transmit, by an ultrasonic sensing unit, ultrasonic waves In a second stage, provide a signal of a data input terminal to a third node and compensate a voltage of the second node; receive reflected ultrasonic echoes and generate a first induction signal at the first node; output a second induction signal to an output terminal under control of the first induction signal of the first node In a third stage, provide the signal of the first power supply terminal to a fourth node, provide a signal of the fourth node to the third node, and provide a signal of the third node to a first electrode of a light-emitting unit

FIG. 18

PIXEL DRIVING CIRCUIT, DRIVING METHOD THEREOF AND DISPLAY PANEL

CROSS-REFERENCE TO RELATED APPLICATIONS

The present application is a U.S. National Phase Entry of International Application No. PCT/CN2021/077574 having an international filing date of Feb. 24, 2021, which claims priority to Chinese patent application No. 202010325461.1 filed to the CNIPA on Apr. 23, 2020 and entitled "Pixel Driving Circuit, Driving Method thereof and Display Panel". The above-identified applications are incorporated herein by reference in their entirety.

TECHNICAL FIELD

Embodiments of the present disclosure relate to, but are not limited to, the field of display technology, in particular to a pixel driving circuit, a driving method thereof and a display panel.

BACKGROUND

Fingerprint identification is a biometric approach, which has been widely applied in smart phones, security devices and other fields. At present, common fingerprint identification approaches include optical identification, capacitive identification and ultrasonic identification. Ultrasonic fingerprint identification has attracted much attention for its good penetration, high accuracy, underwater unlocking and living body identification.

In some display modules with ultrasonic fingerprint sensors, the display modules have independent display circuits and logic circuit structures, and the ultrasonic fingerprint sensors are usually attached to the lower sides of the display panels in the form of plug-in modules, which not only leads to the large overall thickness of the display modules, but also leads to the high power consumption of the display modules.

SUMMARY

The following is a brief description of the subject matter detailed herein. This brief description is not intended to limit the scope of protection of the claims.

An embodiment of the present disclosure provides a pixel driving circuit, a driving method thereof and a display panel.

In a first aspect, an embodiment of the present disclosure provides a pixel driving circuit, including a pixel driving module, an ultrasonic driving unit, an ultrasonic sensing unit and a signal acquisition unit.

The pixel driving module is respectively connected with a first power supply terminal, a first signal terminal, a second signal terminal, a data input terminal and a first electrode of a light-emitting unit, and is configured to provide a driving signal to the first electrode of the light-emitting unit according to signals of the first power supply terminal and the data input terminal under the control of the first signal terminal and the second signal terminal.

The ultrasonic driving unit is respectively connected with the second signal terminal and a first node, and is configured to provide a signal of the second signal terminal to the first node under the control of the second signal terminal.

A first electrode of the ultrasonic sensing unit is connected with the first node, and a second electrode of the ultrasonic sensing unit is connected with a third power supply terminal; the ultrasonic sensing unit is configured to transmit ultrasonic waves according to signals of the first node and the third power supply terminal, receive reflected ultrasonic echoes and generate a first induction signal at the first node.

The signal acquisition unit is respectively connected with the first power supply terminal, the first node and an output terminal, and is configured to output a second induction signal to the output terminal according to the first power supply terminal and the first induction signal under the control of the first induction signal of the first node.

In an exemplary embodiment, the pixel driving module includes a charging unit, a storage unit, a writing unit, a driving unit and a control unit.

The charging unit is respectively connected with the first power supply terminal, the first signal terminal, the second signal terminal, a second node and a fourth node; the charging unit is configured to provide a signal of the first power supply terminal to the second node through the fourth node under control of the first signal terminal and the second signal terminal; the charging unit is further configured to provide the signal of the first power supply terminal to the fourth node under control of the first signal terminal and the second signal terminal.

A first electrode of the storage unit is connected with the second node, and a second electrode of the storage unit is connected with the first electrode of the light-emitting unit; the storage unit is configured to store a signal of the second node.

The writing unit is respectively connected with the second signal terminal, the data input terminal and a third node, and is configured to provide a signal of the data input terminal to the third node under control of the second signal terminal.

The driving unit is respectively connected with the second node, the fourth node and the third node, the driving unit is configured to provide a signal of the third node to the second node under control of the second node, and the driving unit is further configured to make the fourth node and the third node be on under control of the second node.

The control unit is respectively connected with the third node, the first signal terminal and the first electrode of the light-emitting unit, and is configured to make the third node and the first electrode of the light-emitting unit be on under control of the first signal terminal.

In an exemplary embodiment, the pixel driving circuit further includes a resetting unit, the resetting unit is respectively connected with the first signal terminal, a fourth power supply terminal and the first electrode of the light-emitting unit, and the resetting unit is configured to provide a signal of the fourth power supply terminal to the first electrode of the light-emitting unit under control of the first signal terminal.

In an exemplary embodiment, the charging unit includes a first transistor and a second transistor; a control electrode of the first transistor is connected with the second signal terminal, a first electrode of the first transistor is connected with the first power supply terminal, and a second electrode of the first transistor is connected with the fourth node; a control electrode of the second transistor is connected with the first signal terminal, a first electrode of the second transistor is connected with the fourth node, and a second electrode of the second transistor is connected with the second node.

In an exemplary embodiment, the writing unit includes a third transistor, a control electrode of the third transistor is connected with the second signal terminal, a first electrode of the third transistor is connected with the data input terminal, and a second electrode of the third transistor is connected with the third node.

In an exemplary embodiment, the driving unit includes a fourth transistor, a control electrode of the fourth transistor is connected with the second node, a first electrode of the fourth transistor is connected with the fourth node, and a second electrode of the fourth transistor is connected with the third node.

In an exemplary embodiment, the control unit includes a fifth transistor, a control electrode of the fifth transistor is connected with the first signal terminal, a first electrode of the fifth transistor is connected with the third node, and a second electrode of the fifth transistor is connected with the first electrode of the light-emitting unit.

In an exemplary embodiment, the resetting unit includes a sixth transistor, a control electrode of the sixth transistor is connected with the first signal terminal, a first electrode of the sixth transistor is connected with the fourth power supply terminal, and a second electrode of the sixth transistor is connected with the first electrode of the light-emitting unit.

In an exemplary embodiment, the ultrasonic driving unit includes a seventh transistor, a control electrode and a first electrode of the seventh transistor are connected with the second signal terminal, and a second electrode of the seventh transistor is connected with the first node.

In an exemplary embodiment, the signal acquisition unit includes an eighth transistor, a control electrode of the eighth transistor is connected with the first node, a first electrode of the eighth transistor is connected with the first power supply terminal, and a second electrode of the eighth transistor is connected with the output terminal.

In an exemplary embodiment, the signal acquisition unit further includes a ninth transistor located between the eighth transistor and the output terminal, a control electrode of the ninth transistor is connected with the first signal terminal, a first electrode of the ninth transistor is connected with the second electrode of the eighth transistor, and a second electrode of the ninth transistor is connected with the output terminal.

In an exemplary embodiment, the pixel driving circuit further includes a resetting unit, the resetting unit includes a sixth transistor, the charging unit includes a first transistor and a second transistor, the storage unit includes a storage capacitor, the writing unit includes a third transistor, the driving unit includes a fourth transistor, the control unit includes a fifth transistor, the ultrasonic driving unit includes a seventh transistor, the signal acquisition unit includes an eighth transistor and a ninth transistor, and the light-emitting unit includes an organic light-emitting diode.

A control electrode of the first transistor is connected with the second signal terminal, a first electrode of the first transistor is connected with the first power supply terminal, and a second electrode of the first transistor is connected with the fourth node.

A control electrode of the second transistor is connected with the first signal terminal, a first electrode of the second transistor is connected with the fourth node, and a second electrode of the second transistor is connected with the second node.

A control electrode of the third transistor is connected with the second signal terminal, a first electrode of the third transistor is connected with the data input terminal, and a second electrode of the third transistor is connected with the third node.

A control electrode of the fourth transistor is connected with the second node, a first electrode of the fourth transistor is connected with the fourth node, and a second electrode of the fourth transistor is connected with the third node.

A control electrode of the fifth transistor is connected with the first signal terminal, a first electrode of the fifth transistor is connected with the third node, and a second electrode of the fifth transistor is connected with the first electrode of the organic light-emitting diode.

A second electrode of the organic light-emitting diode is connected with the second power supply terminal.

A first electrode plate of the storage capacitor is connected with the second node, and a second electrode plate of the storage capacitor is connected with a first electrode of the organic light-emitting diode.

A control electrode of the sixth transistor is connected with the first signal terminal, a first electrode of the sixth transistor is connected with the fourth power supply terminal, and a second electrode of the sixth transistor is connected with the first electrode of the organic light-emitting diode.

A control electrode and a first electrode of the seventh transistor are connected with the second signal terminal, and a second electrode of the seventh transistor is connected with the first node.

A control electrode of the eighth transistor is connected with the first node, a first electrode of the eighth transistor is connected with the first power supply terminal, and a second electrode of the eighth transistor is connected with a first electrode of the ninth transistor.

A control electrode of the ninth transistor is connected with the first signal terminal, and a second electrode of the ninth transistor is connected with the output terminal.

A first electrode of the ultrasonic sensing unit is connected with the first node, and a second electrode of the ultrasonic sensing unit is connected with the third power supply terminal.

In a second aspect, an embodiment of the present disclosure further provides a driving method of a pixel driving circuit, which is applied to the pixel driving circuit described above and includes: in a first stage, providing a signal of the first power supply terminal to a second node, providing a signal of the second signal terminal to the first node, and transmitting, by the ultrasonic sensing unit, ultrasonic waves; in a second stage, providing a signal of the data input terminal to a third node and compensating a voltage of the second node; receiving reflected ultrasonic echoes and generating a first induction signal at the first node; outputting a second induction signal to the output terminal under control of the first induction signal of the first node; and in a third stage, conducting the first power supply terminal and a second power supply terminal through a charging unit, a driving unit, a control unit and a light-emitting unit.

In an exemplary embodiment, the method further includes: in the first stage, providing a signal of a fourth power supply terminal to a first electrode of the light-emitting unit.

In a third aspect, an embodiment of the present disclosure further provides a display panel, including a plurality of the pixel driving circuits described above.

Other features and advantages of the present disclosure will be described in the subsequent description, and, in part, become apparent from the description, or can be understood by implementing the present disclosure. The purpose and other advantages of the present disclosure may be realized and obtained through the structure specifically pointed out in the description and the drawings.

After reading and understanding the drawings and the detailed description, other aspects can be understood.

BRIEF DESCRIPTION OF DRAWINGS

The drawings are used to provide a further understanding of the technical solutions of the present disclosure and constitute a part of the description, which are used together with the embodiments of the present disclosure to explain the technical solutions of the present disclosure and do not constitute limitations to the technical solutions of the present disclosure.

FIG. 17 illustrates a schematic diagram of a state of a pixel driving circuit in a third stage in an exemplary embodiment of the present disclosure.

FIG. 18 illustrates a schematic diagram of a driving method of a pixel driving circuit in an exemplary embodiment of the present disclosure.

DETAILED DESCRIPTION

Figure 1:
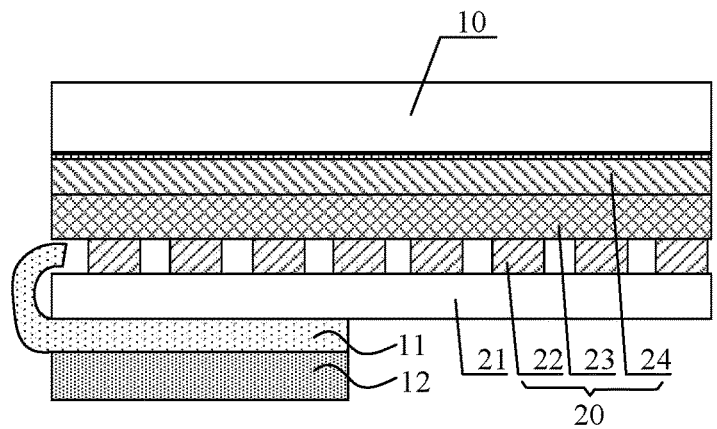
FIG. 1 illustrates a schematic diagram of a structure of a display module with an ultrasonic fingerprint sensor.

The present disclosure describes a plurality of embodiments, but the description is exemplary rather than restrictive. It will be apparent to those of ordinary skill in the art that there may be more embodiments and implementation solutions within the scope of the embodiments described in the present disclosure. Although many possible combinations of features are illustrated in the drawings and discussed in the embodiments, many other combinations of the disclosed features are possible. Unless specifically limited, any feature or element of any embodiment may be used in combination with or in place of any other feature or element in any other embodiment.

The present disclosure includes and envisages combinations with features and elements known to those of ordinary skill in the art. The embodiments, features and elements already disclosed in the present disclosure may be combined with any conventional features or elements to form a unique solution defined by the claims. Any feature or element of any embodiment may be combined with features or elements from other solutions to form another unique solution defined by the claims. Therefore, it should be understood that any features shown and/or discussed in the present disclosure may be implemented individually or in any appropriate combination. Therefore, the embodiments are not subject to other limitations except those made according to the appended claims and their equivalent replacements. In addition, various modifications and changes may be made within the scope of protection of the appended claims.

In addition, when describing representative embodiments, the specification may have presented the method and/or process as a specific sequence of acts. However, to the extent that the method or process does not depend on the specific order of acts described herein, the method or process should not be limited to the specific order of acts described herein. As will be understood by those of ordinary skill in the art, other act orders are possible. Therefore, the specific order of acts set forth in the specification should not be interpreted as limiting the claims. In addition, the claims for the method and/or process should not be limited to performing their acts in the written order. Those skilled in the art can easily understand that these orders may be changed and remain within the spirit and scope of the embodiments of the present disclosure.

Unless otherwise defined, the technical terms or scientific terms disclosed in the embodiments of the present disclosure shall have a general meaning understood by those of ordinary skill in the art to which the present disclosure belongs. Words such as "first" and "second" used in the embodiments of the present disclosure do not mean any order, quantity or importance, but are only used to distinguish different components. Words such as "including" or "comprising" mean that the element or object appearing before the word covers the elements or objects listed after the word and their equivalents, and do not exclude other elements or objects. Words such as "connect" or "connected" are not limited to physical or mechanical connection, but may include electrical connection, whether direct or indirect.

It can be understood by those skilled in the art that the transistors used in all embodiments of the present disclosure may be thin film transistors, field effect transistors or other devices with the same characteristics. Preferably, the thin film transistors used in the embodiments of the present disclosure may be oxide semiconductor transistors. Since the source and drain of the transistor used here are symmetrical, the source and drain may be interchanged. In the embodiments of the present disclosure, the gate of the transistor is called a control electrode. In order to distinguish the two electrodes of the transistor other than the gate, one of them is called first electrode and the other is called second electrode. The first electrode may be a source or drain, and the second electrode may be a drain or source.

FIG. 1 illustrates a schematic diagram of a structure of a display module with an ultrasonic fingerprint sensor. Referring to FIG. 1, the display module may include an ultrasonic fingerprint sensor 20. The display module may further include a substrate 21. The ultrasonic fingerprint sensor 20 may include a first electrode layer 22 disposed on an upper side of the substrate 21, a piezoelectric material layer 23 disposed on an upper side of the first electrode layer 22, and a second electrode layer 24 disposed on an upper side of the piezoelectric material layer 23. The display module may further include a flexible circuit board 11 located on a lower side of the substrate 21 after bending, and a signal processing chip 12 disposed on the flexible circuit board 11. In the display module illustrated in FIG. 1, the ultrasonic fingerprint sensor 20 is attached to a lower side of the display panel 10 in the form of a plug-in module. The display module has an independent display circuit and logic circuit structure. Therefore, the display module illustrated in FIG. 1 not only increases the overall thickness of the display module, but also increases the power consumption of the display module.

Figure 2:
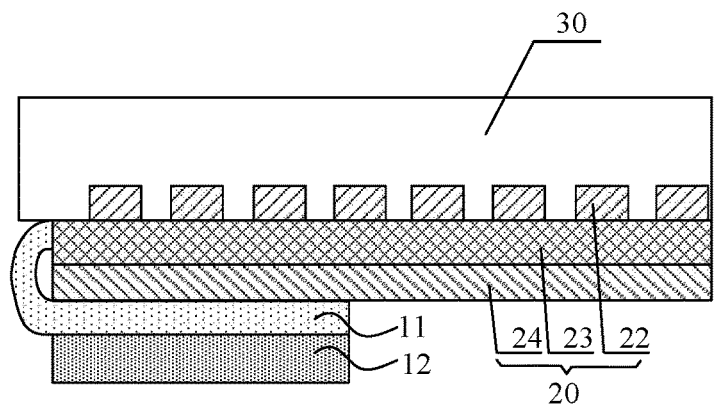
FIG. 2 illustrates a schematic diagram of a structure of an Organic Light-Emitting Diode (OLED) display module.

FIG. 2 is a schematic diagram of a structure of an OLED display module. Referring to FIG. 2, the OLED display module may include a pixel driving module 30, an ultrasonic fingerprint sensor 20 and a flexible circuit board 11. The ultrasonic fingerprint sensor 20 may include a first electrode layer 22 disposed on a lower side of the pixel driving module 30, a piezoelectric material layer 23 disposed on a lower side of the first electrode layer 22, and a second electrode layer 24 disposed on a lower side of the piezoelectric material layer 23. The flexible circuit board 11 is located on a lower side of the second electrode layer 24 after bending, and a signal processing chip 12 is disposed on a lower side of the flexible circuit board 11. In the display module illustrated in FIG. 2, an echo acquisition circuit of the ultrasonic fingerprint sensor 20 and a pixel driving circuit are integrated in the display panel. Although the overall thickness of the display module illustrated in FIG. 2 is much smaller than that of the display module illustrated in FIG. 1, the display area circuit and gate driving circuit of the display module illustrated in FIG. 2 are complex, the thickness of the display module is still large, and it is difficult to achieve high PPI (Pixels Per Inch) and a narrow frame.

In an exemplary embodiment, the pixel driving circuit provided by an embodiment of the present disclosure may include three stages, namely, a first stage T1, a second stage T2 and a third stage T3. The first stage T1 may be called a pixel charging and ultrasonic transmission stage, the second stage T2 may be called a writing compensation and echo acquisition stage, and the third stage T3 may be called a pixel luminescence stage.

Figure 3:
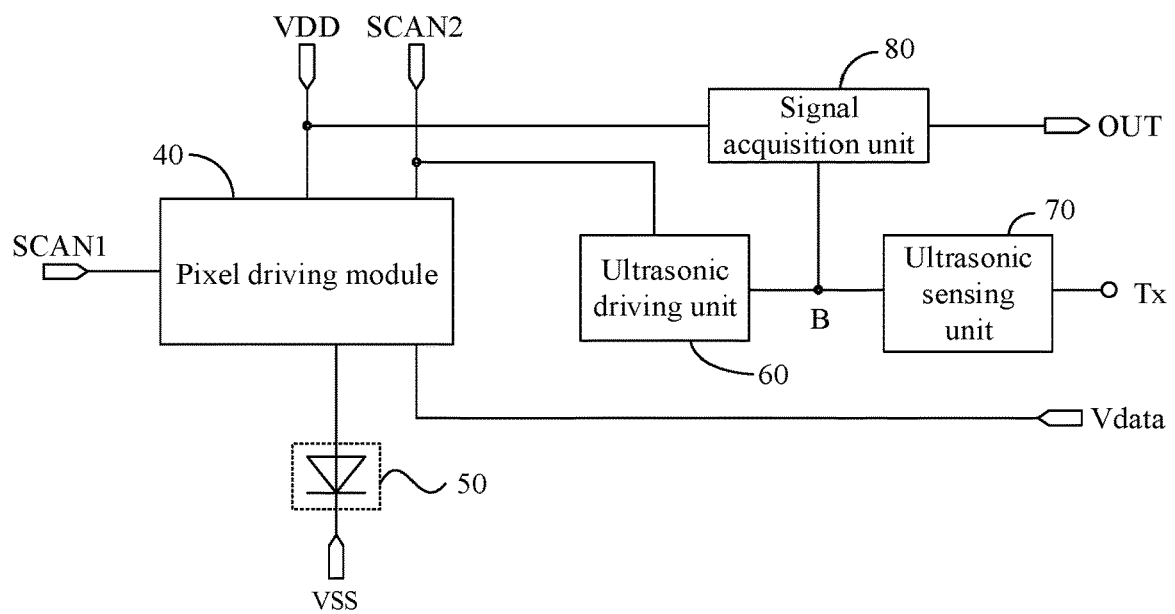
FIG. 3 illustrates a schematic diagram of a pixel driving circuit in an exemplary embodiment of the present disclosure.

FIG. 3 illustrates a schematic diagram of a pixel driving circuit in an exemplary embodiment of the present disclosure. Referring to FIG. 3, the pixel driving circuit may include a pixel driving module 40, an ultrasonic driving unit 60, an ultrasonic sensing unit 70, and a signal acquisition unit 80.

The pixel driving module 40 is respectively connected with a first power supply terminal VDD, a first signal terminal SCAN1, a second signal terminal SCAN2, a data input terminal Vdata and a first electrode of a light-emitting unit 50. The pixel driving module 40 is configured to provide a driving signal to the first electrode of the light-emitting unit 50 according to signals of the first power supply terminal VDD and the data input terminal Vdata under the control of the first signal terminal SCAN1 and the second signal terminal SCAN2, so as to drive the light-emitting unit 50 to emit light.

The first electrode of the light-emitting unit 50 is connected with the pixel driving module 40, and a second electrode of the light-emitting unit 50 is connected with a second power supply terminal VSS. The light-emitting unit 50 is configured to emit light under the control of the pixel driving module 40 and the second power supply terminal VSS. For example, the first electrode of the light-emitting unit 50 may be an anode and the second electrode thereof may be a cathode.

The ultrasonic driving unit 60 is respectively connected with the second signal terminal SCAN2 and a first node B. The ultrasonic driving unit 60 is configured to provide a signal of the second signal terminal SCAN2 to the first node B under the control of the second signal terminal SCAN2.

A first electrode of the ultrasonic sensing unit 70 is connected with the first node B, and a second electrode of the ultrasonic sensing unit 70 is connected with a third power supply terminal Tx. The ultrasonic sensing unit 70 is configured to transmit ultrasonic waves according to the signals of the first node B and the third power supply terminal Tx, receive reflected ultrasonic echoes, and generate a first induction signal at the first node B.

The signal acquisition unit 80 is respectively connected with the first power supply terminal VDD, the first node B and an output terminal OUT. The signal acquisition unit 80 is configured to output a second induction signal to the output terminal OUT according to the first power supply terminal VDD and the first induction signal of the first node B under the control of the first induction signal of the first node B.

The pixel driving circuit provided by the embodiment of the present disclosure integrates an ultrasonic fingerprint identification function into the pixel driving circuit, reduces circuit complexity of the display area and GOA (Gate Driver on Array) area in the display panel, thereby reducing the overall thickness of the display panel, reducing the power consumption of the display panel, thereby beneficial to achieve high PPI and narrow frame of the display panel.

Figure 4:
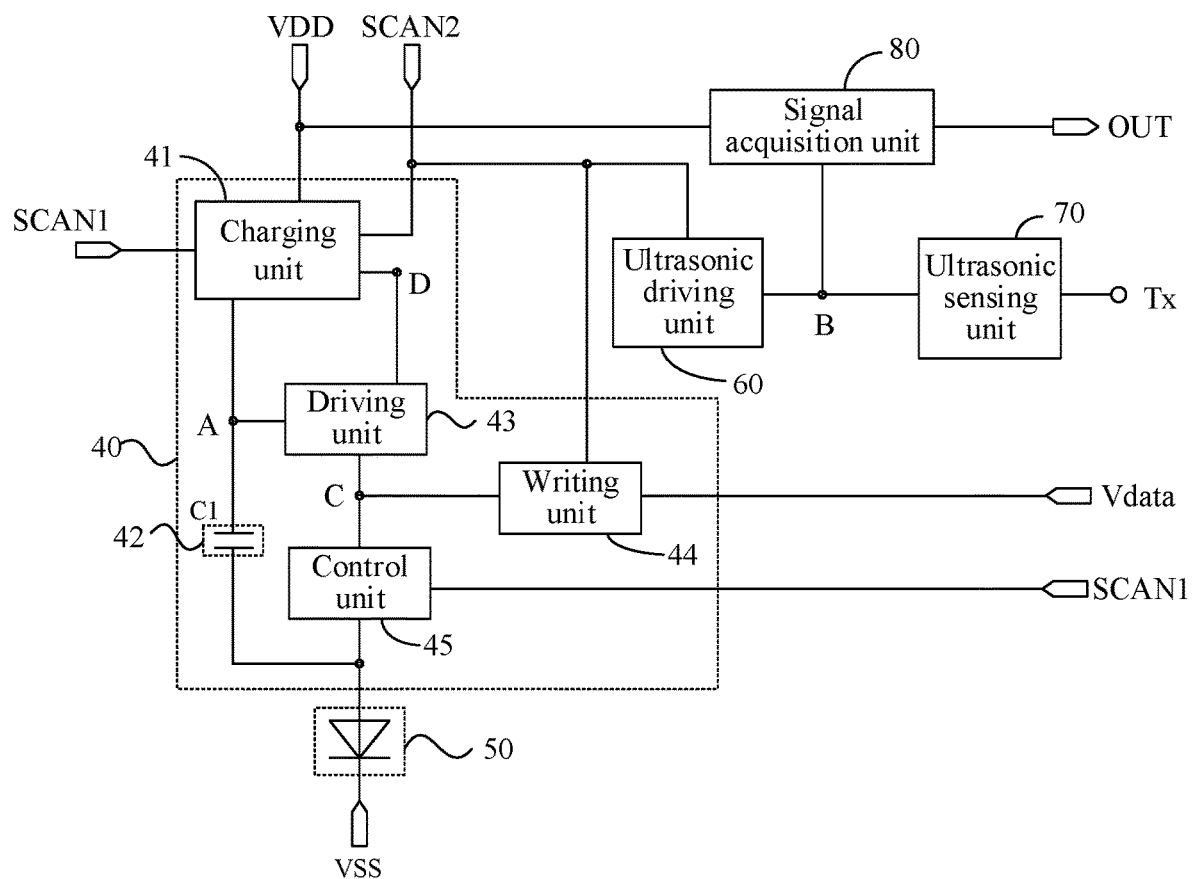
FIG. 4 illustrates a schematic diagram of a pixel driving circuit in another exemplary embodiment of the present disclosure.

FIG. 4 illustrates a schematic diagram of a pixel driving circuit in another exemplary embodiment of the present disclosure. In an exemplary embodiment, referring to FIG. 4, the pixel driving module 40 may include a charging unit 41, a storage unit 42, a driving unit 43, a writing unit 44, and a control unit 45.

The charging unit 41 is respectively connected with the first power supply terminal VDD, the first signal terminal SCAN1, the second signal terminal SCAN2, a second node A, and a fourth node D. In the first stage T1, the charging unit 41 is configured to provide a signal of the first power supply terminal VDD to the second node A through the fourth node D under the control of the first signal terminal SCAN1 and the second signal terminal SCAN2. In the third stage T3, the charging unit 41 is configured to provide the signal of the first power supply terminal VDD to the fourth node D under the control of the first signal terminal SCAN1 and the second signal terminal SCAN2.

A first electrode of the storage unit 42 is connected with the second node A, and a second electrode of the storage unit 42 is connected with the first electrode of the light-emitting unit 50. The storage unit 42 is configured to store the signal of the second node A. For example, the storage unit 42 may be a storage capacitor C1. A first electrode plate of the storage capacitor C1 is connected with the second node A, and a second electrode plate of the storage capacitor C1 is connected with the first electrode of the light-emitting unit 50.

The writing unit 44 is respectively connected with the second signal terminal SCAN2, the data input terminal Vdata and a third node C. The writing unit 44 is configured to provide a signal of the data input terminal Vdata to the third node C under the control of the second signal terminal SCAN2.

The driving unit 43 is respectively connected with the second node A, the fourth node D and the third node C. In the second stage T2, the driving unit 43 is configured to provide a signal of the third node C to the second node A and compensate the signal of the second node A under the control of the second node A. In the third stage T3, the driving unit is configured to provide the signal of the fourth node D to the third node C under the control of the second node A.

The control unit 45 is respectively connected with the third node C, the first signal terminal SCAN1 and the first electrode of the light-emitting unit 50, and is configured to provide the signal of the third node C to the first electrode of the light-emitting unit 50 under the control of the first signal terminal SCAN1 and drive the light-emitting unit 50 to emit light.

In an exemplary embodiment, when the pixel driving module 40 drives the light-emitting unit 50 to emit light, the signal of the first power supply terminal VDD is a continuous high-level signal and the signal of the second power supply terminal VSS is a continuous low-level signal to form a voltage difference to ensure that the light-emitting unit 50 can be driven to emit light.

Figure 5:
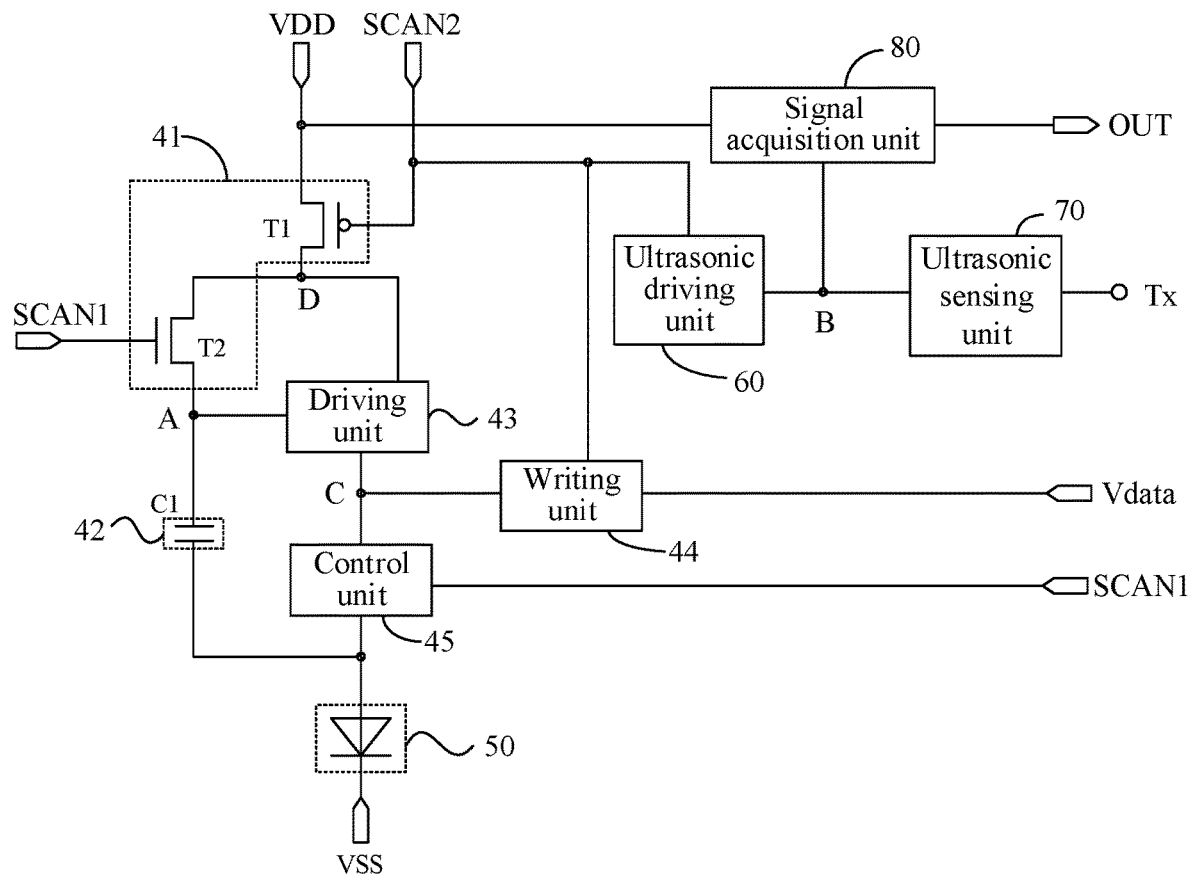
FIG. 5 illustrates an equivalent schematic diagram of a charging unit in an exemplary embodiment of the present disclosure.

FIG. 5 is an equivalent schematic diagram of a charging unit in an exemplary embodiment of the present disclosure. In an exemplary embodiment, referring to FIG. 5, the charging unit 41 may include a first transistor T1 and a second transistor T2.

A control electrode of the first transistor T1 is connected with the second signal terminal SCAN2, a first electrode of the first transistor T1 is connected with the first power supply terminal VDD, and a second electrode of the first transistor T1 is connected with the fourth node D. A control electrode of the second transistor T2 is connected with the first signal terminal SCAN1, a first electrode of the second transistor T2 is connected with the fourth node D, and a second electrode of the second transistor T2 is connected with the second node A.

In an exemplary embodiment, referring to FIG. 5, the first transistor T1 may be a P-type transistor. When the signal of the second signal terminal SCAN2 is a low-level signal, the first transistor T1 is in an on state; when the signal of the second signal terminal SCAN2 is a high-level signal, the first transistor T1 is in an off state. Alternatively, the second transistor T2 may be an N-type transistor. When the signal of the first signal terminal SCAN1 is a high-level signal, the second transistor T2 is in an on state, and when the signal of the first signal terminal SCAN1 is a low-level signal, the second transistor T2 is in an off state.

FIG. 5 illustrates a structure of the charging unit 41 in an exemplary embodiment, but those skilled in the art can understand that the implementation mode of the charging unit is not limited thereto, as long as its function can be realized.

Figure 6:
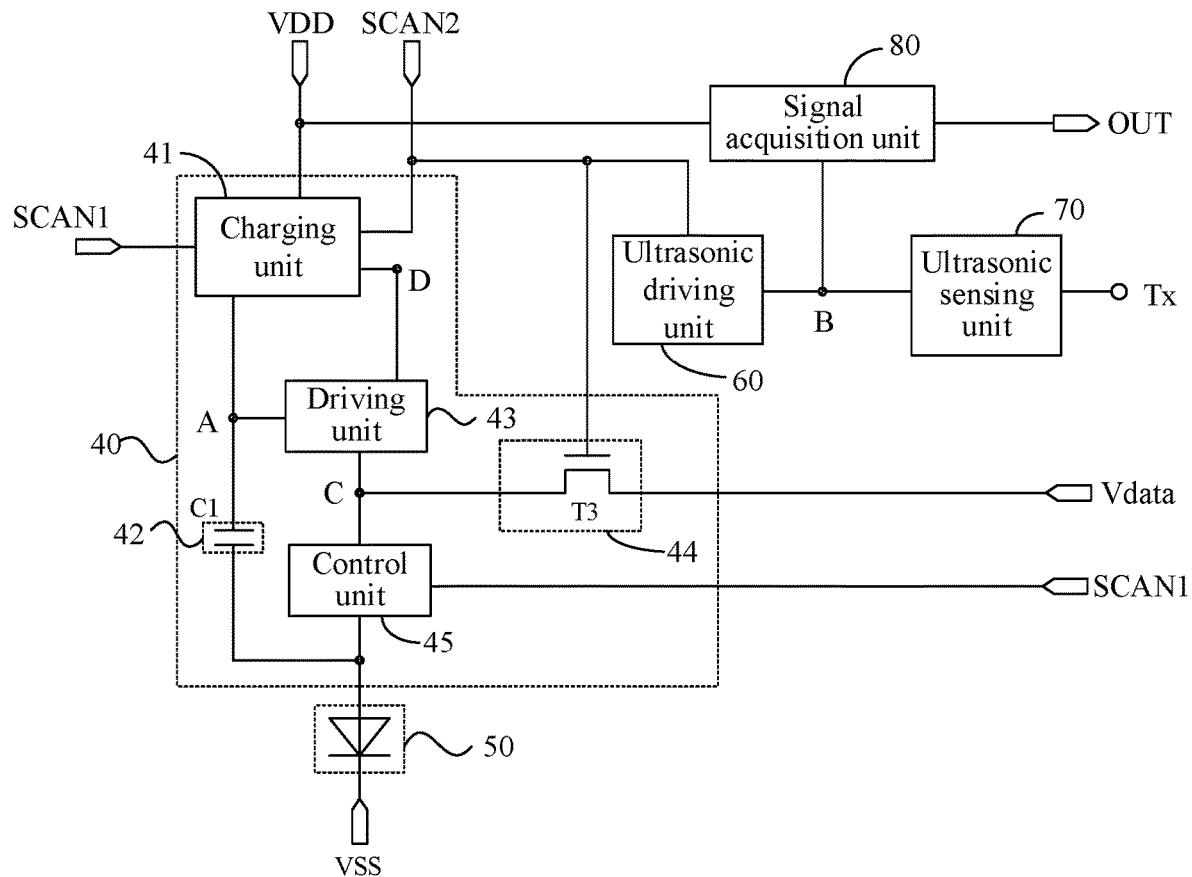
FIG. 6 illustrates an equivalent schematic diagram of a writing unit in an exemplary embodiment of the present disclosure.

FIG. 6 illustrates an equivalent schematic diagram of a writing unit in an exemplary embodiment of the present disclosure. In an exemplary embodiment, referring to FIG. 6, the writing unit 44 may include a third transistor T3.

A control electrode of the third transistor T3 is connected with the second signal terminal SCAN2, a first electrode of the third transistor T3 is connected with the data input terminal Vdata, and a second electrode of the third transistor T3 is connected with the third node C.

In the second stage T2, that is, the writing compensation and echo acquisition stage, the third transistor T3 provides the signal of the data input terminal Vdata to the third node C under the control of the signal of the second signal terminal SCAN2.

In an exemplary embodiment, referring to FIG. 6, the third transistor T3 may be an N-type transistor. When the signal of the second signal terminal SCAN2 is a high-level signal, the third transistor T3 is in an on state; when the signal of the second signal terminal SCAN2 is a low-level signal, the third transistor T3 is in an off state.

FIG. 6 illustrates a structure of the writing unit 44 in an exemplary embodiment, but those skilled in the art can understand that the implementation mode of the writing unit is not limited thereto, as long as its function can be realized.

Figure 7:
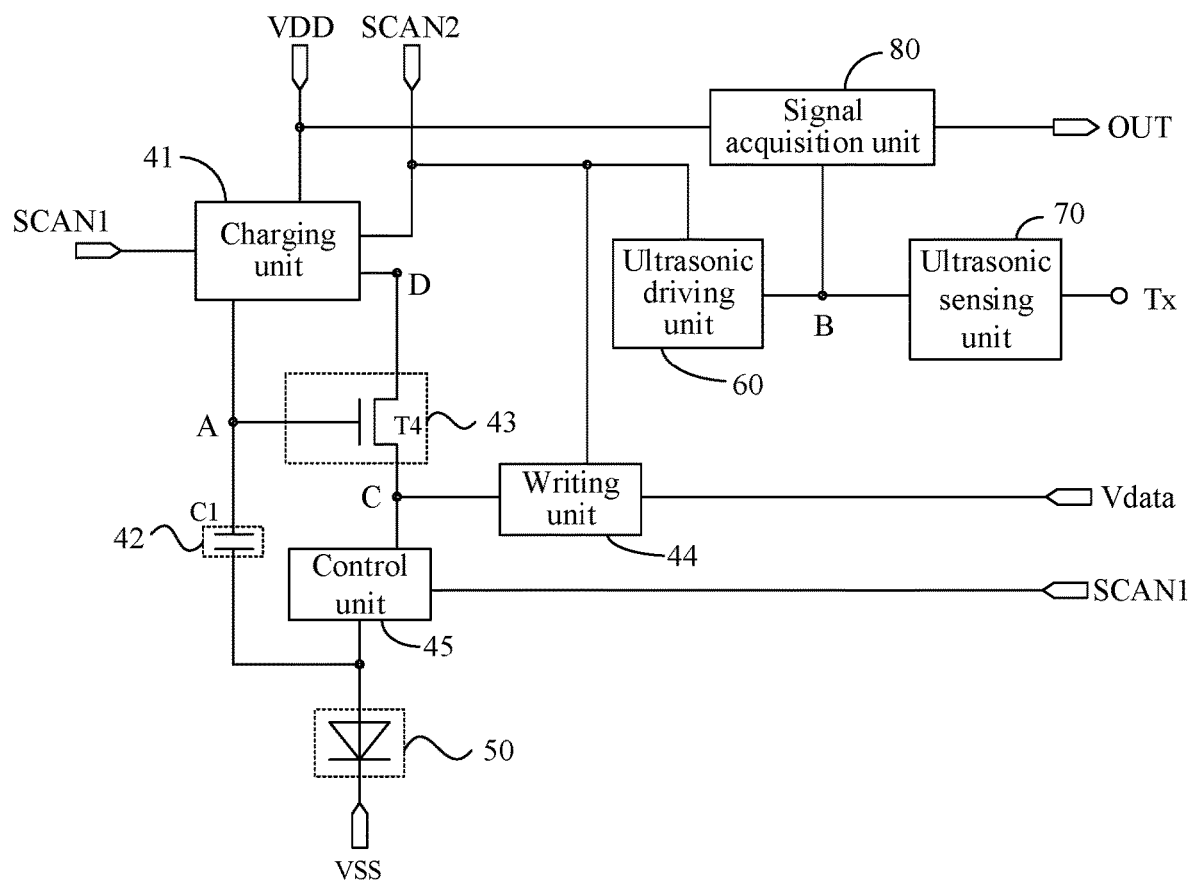
FIG. 7 illustrates an equivalent schematic diagram of a driving unit in an exemplary embodiment of the present disclosure.

FIG. 7 is an equivalent schematic diagram of a driving unit in an exemplary embodiment of the present disclosure. In an exemplary embodiment, referring to FIG. 7, the driving unit 43 may include a fourth transistor T4.

A control electrode of the fourth transistor T4 is connected to the second node A, a first electrode of the fourth transistor T4 is connected to the fourth node D, and a second electrode of the fourth transistor T4 is connected to the third node C.

In an exemplary embodiment, referring to FIG. 7, the fourth transistor T4 may be an N-type transistor. When the signal of the second node A is a high-level signal, the fourth transistor T4 is in an on state; when the signal of the second node A is a low-level signal, the fourth transistor T4 is in an off state.

In the second stage T2, the fourth transistor T4 is used to provide the signal of the third node C to the second node A, so that a potential of the second node A increases to Vth+Vdata, so as to compensate the voltage of the second node A.

In the third stage T3, the fourth transistor T4 provides the signal of the fourth node D to the third node C under the control of the second node A.

FIG. 7 illustrates a structure of the driving unit 43 in an exemplary embodiment, but those skilled in the art can understand that the implementation mode of the driving unit is not limited thereto, as long as its function can be realized.

Figure 8:
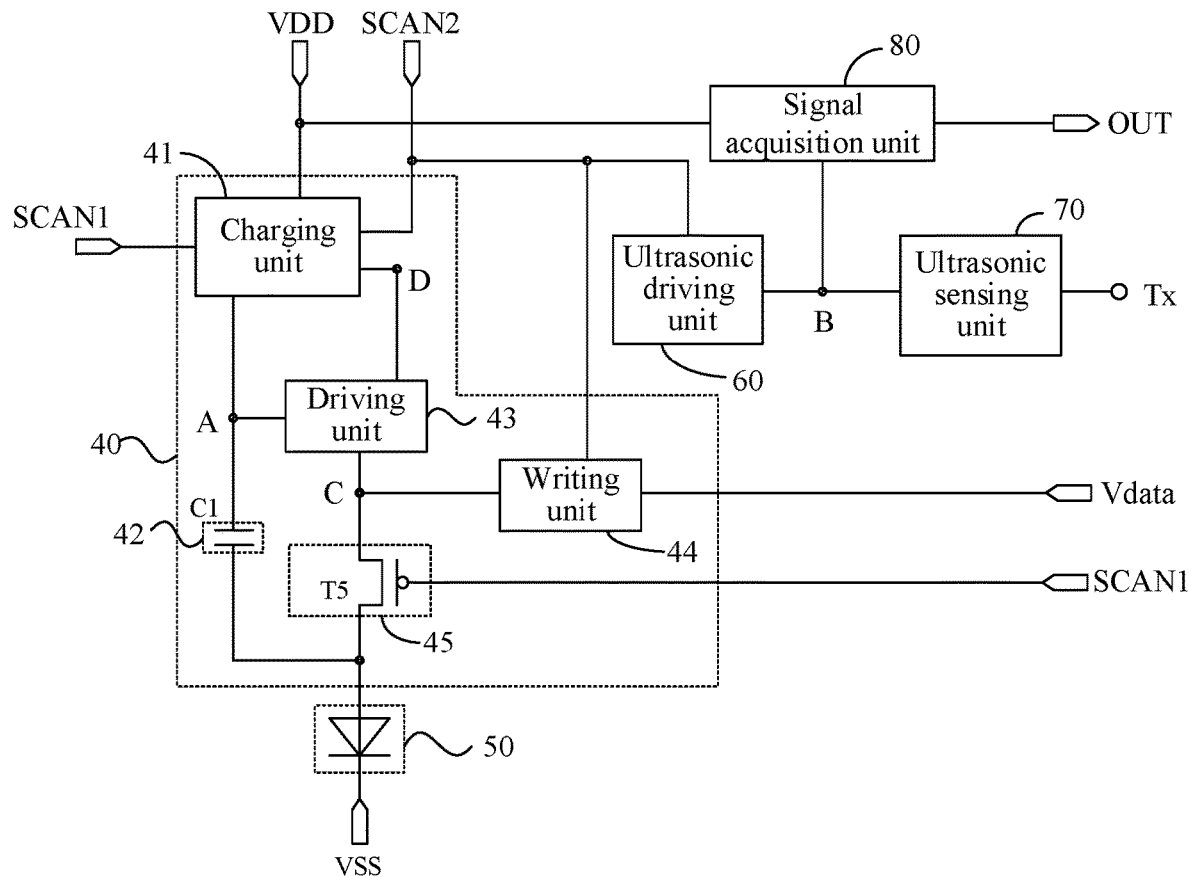
FIG. 8 illustrates an equivalent schematic diagram of a control unit in an exemplary embodiment of the present disclosure.

FIG. 8 illustrates an equivalent schematic diagram of a control unit in an exemplary embodiment of the present disclosure. In an exemplary embodiment, referring to FIG. 8, the control unit 45 may include a fifth transistor T5.

A control electrode of the fifth transistor T5 is connected with the first signal terminal SCAN1, a first electrode of the fifth transistor T5 is connected with the third node C, and a second electrode of the fifth transistor T5 is connected with the first electrode of the light-emitting unit 50.

In an exemplary embodiment, referring to FIG. 8, the fifth transistor T5 may be a P-type transistor. When the signal of the first signal terminal SCAN1 is a low-level signal, the fifth transistor T5 is in an on state; when the signal of the first signal terminal SCAN1 is a high-level signal, the fifth transistor T5 is in an off state.

FIG. 8 illustrates a structure of the control unit 45 in an exemplary embodiment, but those skilled in the art can understand that the implementation mode of the control unit is not limited thereto, as long as its function can be realized.

Figure 9:
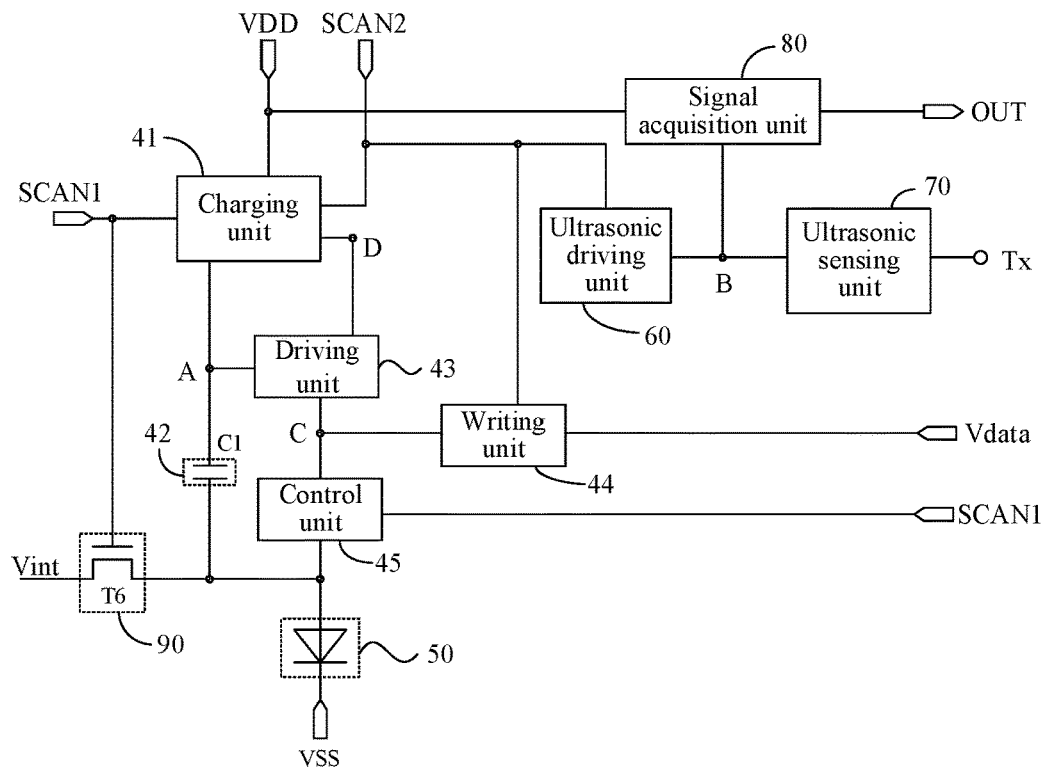
FIG. 9 illustrates an equivalent schematic diagram of a resetting unit in an exemplary embodiment of the present disclosure.

FIG. 9 illustrates an equivalent schematic diagram of a resetting unit in an exemplary embodiment of the present disclosure. In an exemplary embodiment, referring to FIG. 9, the pixel driving circuit may further include a resetting unit 90. The resetting unit 90 is respectively connected with the first signal terminal SCAN1, a fourth power supply terminal Vint and the first electrode of the light-emitting unit 50. The resetting unit 90 is configured to provide the signal of the fourth power supply terminal Vint to the first electrode of the light-emitting unit 50 under the control of the first signal terminal SCAN1, so as to realize the resetting of the first electrode of the light-emitting unit 50 and prevent the light-emitting unit 50 from emitting light when it is not in the state in the third stage T3.

In an exemplary embodiment, referring to FIG. 9, the resetting unit 90 may include a sixth transistor T6. A control electrode of the sixth transistor T6 is connected with the first signal terminal SCAN1, a first electrode of the sixth transistor T6 is connected with the fourth power supply terminal Vint, and a second electrode of the sixth transistor T6 is connected with the first electrode of the light-emitting unit 50.

In an exemplary embodiment, referring to FIG. 9, the sixth transistor T6 may be an N-type transistor. When the signal of the first signal terminal SCAN1 is a high-level signal, the sixth transistor T6 is in an on state; when the signal of the first signal terminal SCAN1 is a low-level signal, the sixth transistor T6 is in an off state.

FIG. 9 illustrates a structure of the resetting unit 90 in an exemplary embodiment, but those skilled in the art can understand that the implementation mode of the resetting unit is not limited thereto, as long as its function can be realized.

Figure 10:
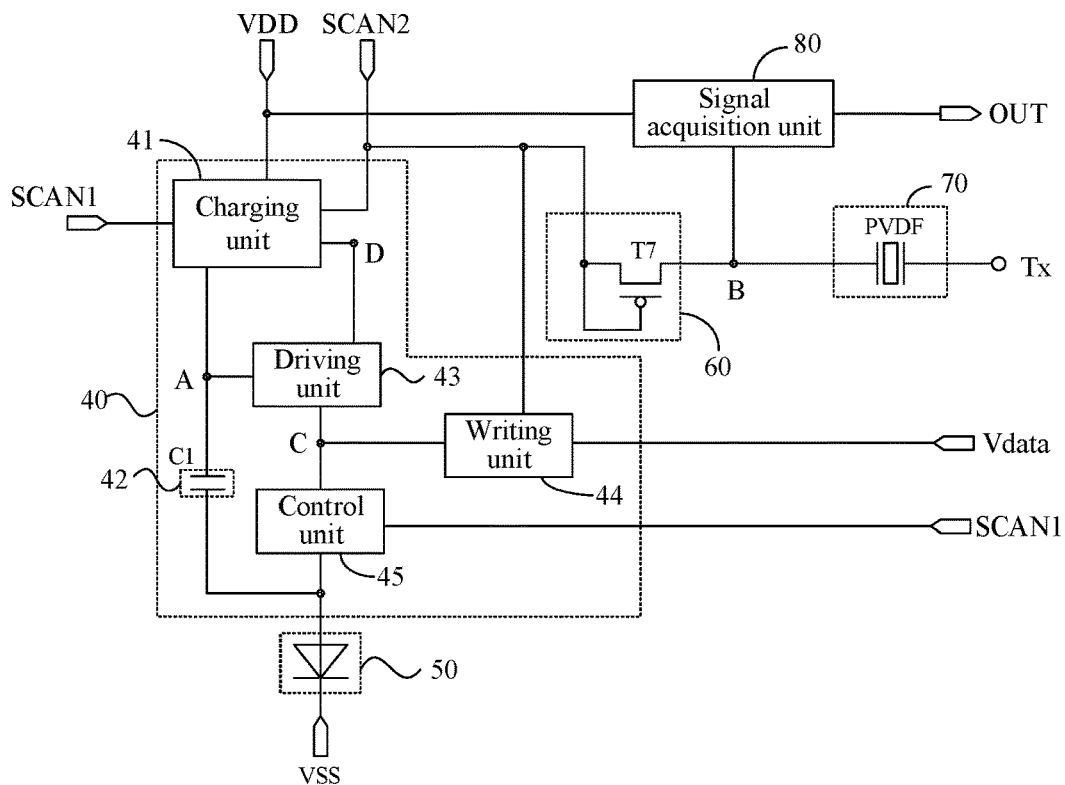
FIG. 10 illustrates an equivalent schematic diagram of an ultrasonic driving unit in an exemplary embodiment of the present disclosure.

FIG. 10 illustrates an equivalent schematic diagram of an ultrasonic driving unit in an exemplary embodiment of the present disclosure. In an exemplary embodiment, referring to FIG. 10, the ultrasonic driving unit 60 may include a seventh transistor T7.

A control electrode and a first electrode of the seventh transistor T7 are connected with the second signal terminal SCAN2, and a second electrode of the seventh transistor T7 is connected with the first node B.

In an exemplary embodiment, referring to FIG. 10, the seventh transistor T7 may be a P-type transistor. When the signal of the second signal terminal SCAN2 is a low-level signal, the seventh transistor T7 is in an on state; when the signal of the second signal terminal SCAN2 is a high-level signal, the seventh transistor T7 is in an off state.

FIG. 10 illustrates a structure of an ultrasonic driving unit 60 in an exemplary embodiment, but those skilled in the art can understand that the implementation mode of the ultrasonic driving unit is not limited thereto, as long as its function can be realized.

In an exemplary embodiment, referring to FIG. 10, the ultrasonic sensing unit 70 may adopt an ultrasonic fingerprint sensor to transmit ultrasonic waves, receive ultrasonic echoes, and convert the ultrasonic echoes into an electrical signal. For example, the ultrasonic fingerprint sensor may include a first electrode, a second electrode, and a piezoelectric material layer sandwiched between the first electrode and the second electrode. For example, the piezoelectric material layer may include a PVDF (polyvinylidene fluoride) material. Referring to FIG. 10, when the ultrasonic sensing unit 70 adopts an ultrasonic fingerprint sensor, a first electrode of the ultrasonic fingerprint sensor is connected with the first node B, and a second electrode of the ultrasonic fingerprint sensor is connected with the third power supply terminal Tx.

In an exemplary embodiment, when the signal of the first node B is a stable low-voltage signal and the third power supply terminal Tx is alternating voltage, the ultrasonic sensing unit 70 may transmit ultrasonic waves; when the third power supply terminal Tx is a stable voltage, the ultrasonic sensing unit 70 may receive reflected ultrasonic echoes and generate a first induction signal at the first node B. The ultrasonic sensing unit 70 may convert the ultrasonic echoes into an electrical signal using PVDF (polyvinylidene fluoride), referring to FIG. 10. Of course, the ultrasonic sensing unit 70 may use other materials to convert the ultrasonic echoes, and the material used may be selected according to the actual use, which is not limited here.

In an exemplary embodiment, when the signal of the second signal terminal SCAN2 is a low-level signal, the seventh transistor T7 provides the low-level signal of the second signal terminal SCAN2 to the first node B at the second signal terminal SCAN2. Alternating voltage is provided to the third power supply terminal Tx, and the ultrasonic sensing unit 70 may transmit ultrasonic waves. When the signal of the second signal terminal SCAN2 is a high-level signal, the seventh transistor T7 is in an off state and provides a stable low voltage to the third power supply terminal Tx, and the ultrasonic sensing unit 70 may receive the reflected ultrasonic echoes and generate a first induction signal at the first node B. In an exemplary embodiment, the first induction signal may be an induced voltage.

Figure 11:
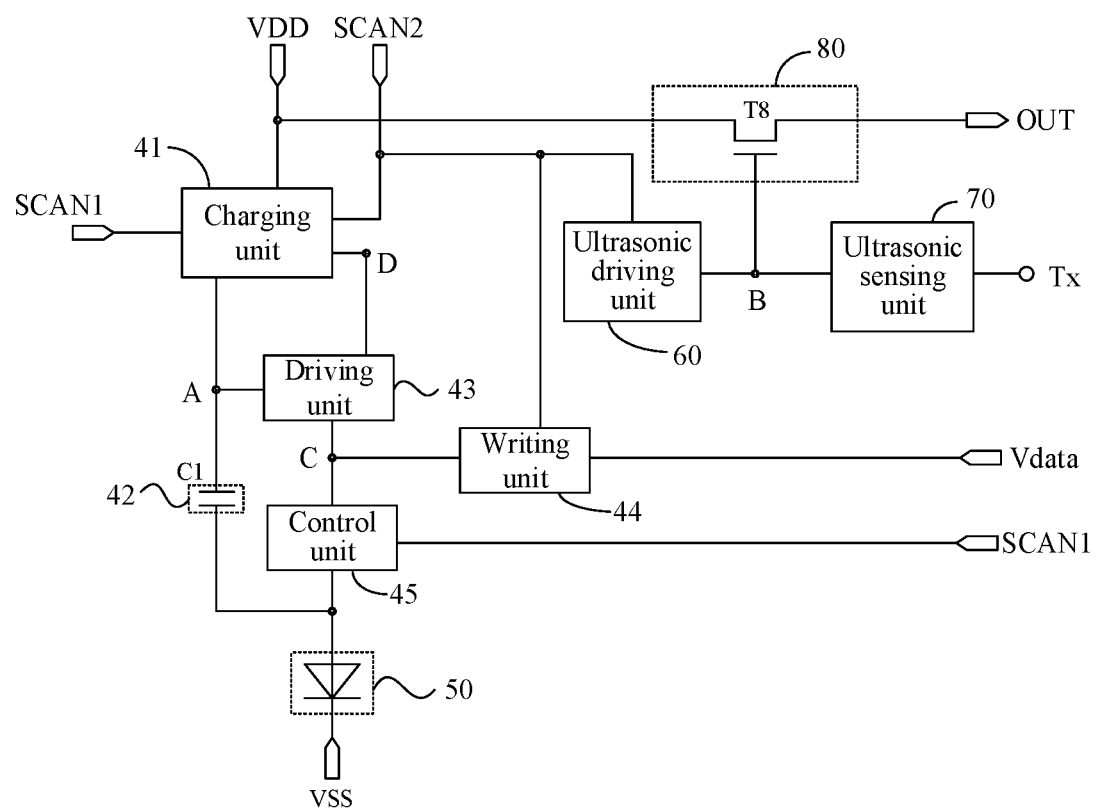
FIG. 11 illustrates an equivalent schematic diagram of a signal acquisition unit in an exemplary embodiment of the present disclosure.

FIG. 11 illustrates an equivalent schematic diagram of a signal acquisition unit in an exemplary embodiment of the present disclosure. In an exemplary embodiment, referring to FIG. 11, the signal acquisition unit 80 may include an eighth transistor T8.

A control electrode of the eighth transistor T8 is connected with the first node B, a first electrode of the eighth transistor T8 is connected with the first power supply terminal VDD, and a second electrode of the eighth transistor T8 is connected with the output terminal OUT.

In an exemplary embodiment, referring to FIG. 11, the eighth transistor T8 may be an N-type transistor. When the signal of the first node B is a high-level signal, the eighth transistor T8 is in an on state; when the signal of the first node B is a low-level signal, the eighth transistor T8 is in an off state.

FIG. 11 illustrates a structure of a signal acquisition unit 80 in an exemplary embodiment, but those skilled in the art can understand that the implementation mode of the signal acquisition unit is not limited thereto, as long as its function can be realized.

Figure 12:
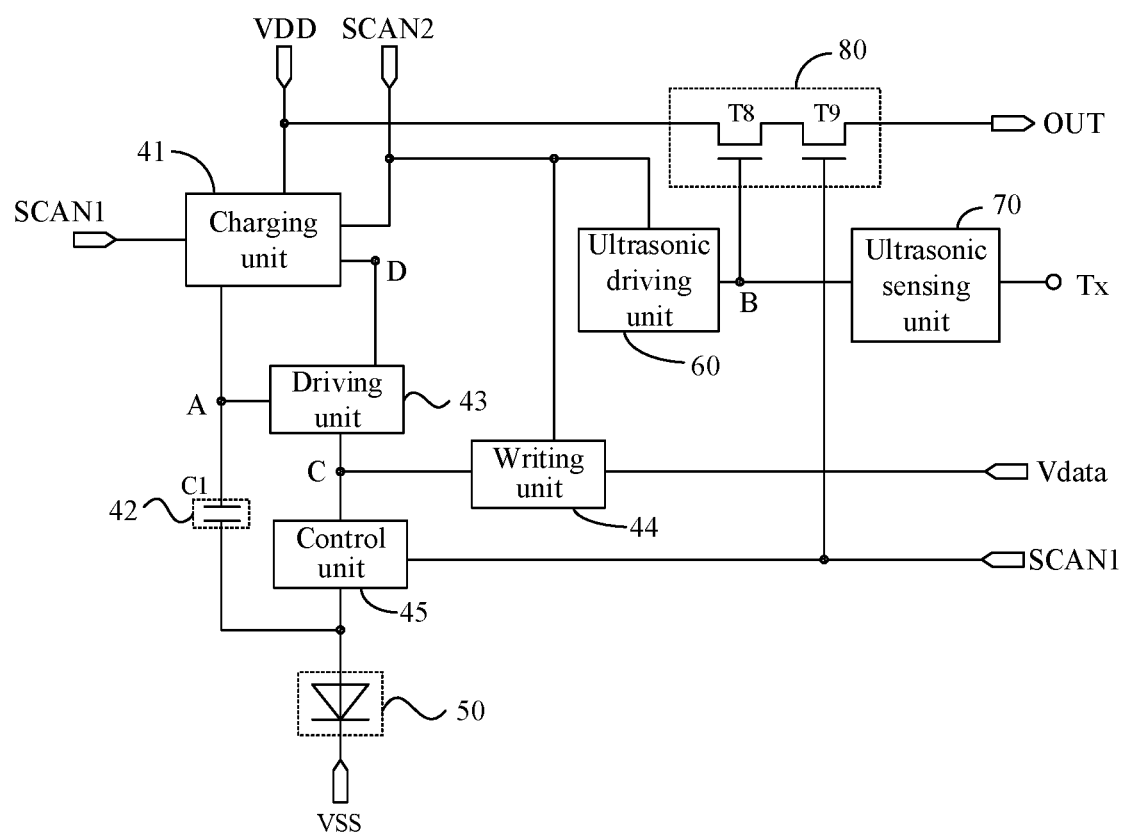
FIG. 12 illustrates an equivalent schematic diagram of a signal acquisition unit in another exemplary embodiment of the present disclosure.

FIG. 12 illustrates an equivalent schematic diagram of a signal acquisition unit in another exemplary embodiment of the present disclosure. In an exemplary embodiment, referring to FIG. 12, the signal acquisition unit 80 may further include a ninth transistor T9, and the second electrode of the eighth transistor T8 is connected to the output terminal OUT through the ninth transistor T9.

A control electrode of the ninth transistor T9 is connected with the first signal terminal SCAN1, a first electrode of the ninth transistor T9 is connected with the second electrode of the eighth transistor, and a second electrode of the ninth transistor T9 is connected with the output terminal OUT.

In the embodiment illustrated in FIG. 12, the signal acquisition unit 80 is respectively connected with the first power supply terminal VDD, the first node B, the first signal terminal SCAN1 and the output terminal OUT. The signal acquisition unit 80 is configured to output a second induction signal to the output terminal OUT according to the first power supply terminal VDD and the first induction signal of the first node B under the control of the first node B and the first signal terminal SCAN1. In an exemplary embodiment, the second induction signal may be an induced current.

In an exemplary embodiment, referring to FIG. 12, the ninth transistor T9 may be an N-type transistor. When the signal of the first signal terminal SCAN1 is a high-level signal, the ninth transistor T9 is in an on state; when the signal of the first signal terminal SCAN1 is a low-level signal, the ninth transistor T9 is in an off state.

FIG. 12 illustrates a structure of a signal acquisition unit 80 in an exemplary embodiment, but those skilled in the art can understand that the implementation mode of the signal acquisition unit is not limited thereto, as long as its function can be realized.

Figure 13:
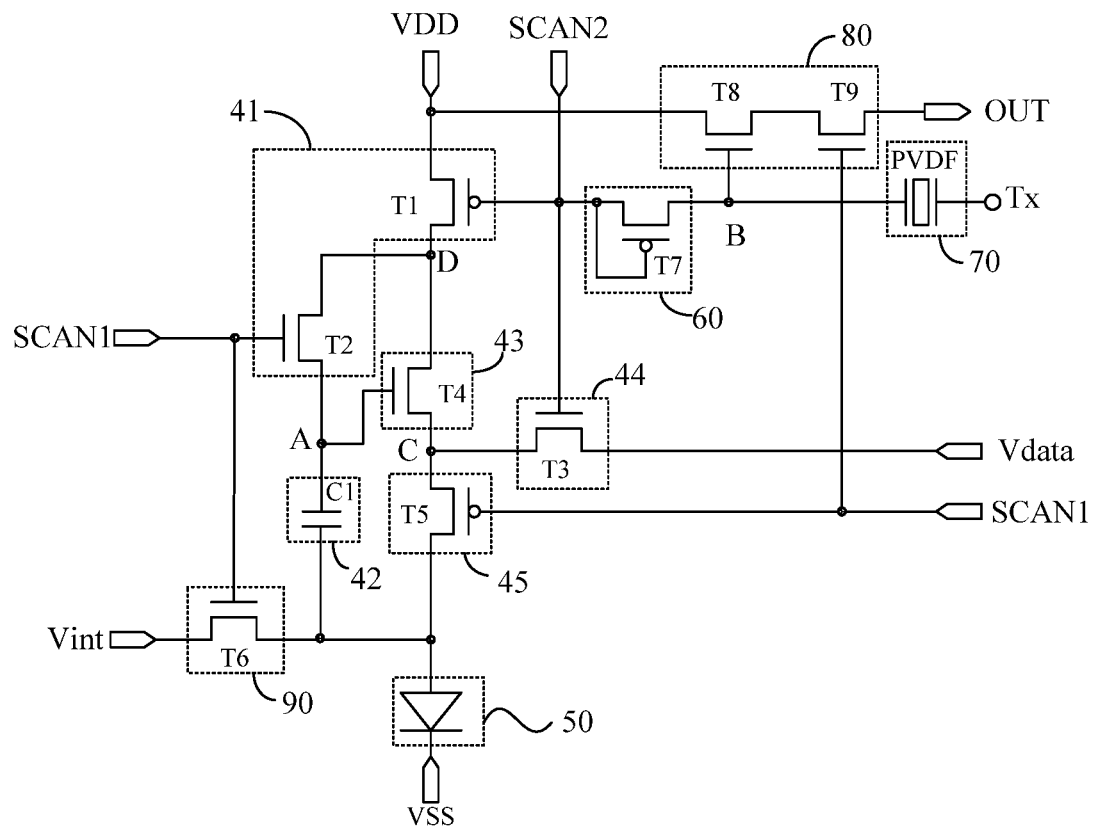
FIG. 13 illustrates an equivalent schematic diagram of a pixel driving circuit in an exemplary embodiment of the present disclosure.

FIG. 13 illustrates an equivalent schematic diagram of a pixel driving circuit in an exemplary embodiment of the present disclosure. In an exemplary embodiment, referring to FIG. 13, the charging unit 41 may include a first transistor T1 and a second transistor T2; the storage unit 42 may include a storage capacitor C1; the writing unit 44 may include a third transistor T3; the driving unit 43 may include a fourth transistor T4; the control unit 45 may include a fifth transistor T5; the resetting unit 90 may include a sixth transistor T6; the light-emitting unit 50 may include a light-emitting device OLED; the ultrasonic driving unit 60 may include a seventh transistor T7; the signal acquisition unit 80 may include an eighth transistor T8 and a ninth transistor T9.

In an exemplary embodiment, referring to FIG. 13, the control electrode of the first transistor T1 is connected with the second signal terminal SCAN2, the first electrode of the first transistor T1 is connected with the first power supply terminal VDD, and the second electrode of the first transistor T1 is connected with the fourth node D. The control electrode of the second transistor T2 is connected with the first signal terminal SCAN1, the first electrode of the second transistor T2 is connected with the fourth node D, and the second electrode of the second transistor T2 is connected with the second node A. The first electrode plate of the storage capacitor C1 is connected with the second node A, and the second electrode plate of the storage capacitor C1 is connected with the first electrode of the light-emitting device OLED. The control electrode of the third transistor T3 is connected with the second signal terminal SCAN2, the first electrode of the third transistor T3 is connected with the data input terminal Vdata, and the second electrode of the third transistor T3 is connected with the third node C. The control electrode of the fourth transistor T4 is connected to the second node A, the first electrode of the fourth transistor T4 is connected to the fourth node D, and the second electrode of the fourth transistor T4 is connected to the third node C. The control electrode of the fifth transistor T5 is connected with the first signal terminal SCAN1, the first electrode of the fifth transistor T5 is connected with the third node C, and the second electrode of the fifth transistor T5 is connected with the first electrode of the light-emitting device OLED. The second electrode of the light-emitting device OLED is connected with the second power supply terminal VSS. The control electrode of the sixth transistor T6 is connected with the first signal terminal SCAN1, the first electrode is connected with the fourth power supply terminal Vint, and the second electrode is connected with the first electrode of the light-emitting device OLED. The second electrode of the light-emitting device OLED is connected with the second power supply terminal VSS.

The control electrode and the first electrode of the seventh transistor T7 are connected with the second signal terminal SCAN2, and the second electrode is connected with the first node B. The first electrode of the ultrasonic sensing unit 70 is connected with the first node B, and the second electrode of the ultrasonic sensing unit 70 is connected with the third power supply terminal Tx. The control electrode of the eighth transistor T8 is connected with the first node B, the first electrode of the eighth transistor T8 is connected with the first power supply terminal VDD, and the second electrode of the eighth transistor T8 is connected with the first electrode of the ninth transistor T9. The control electrode of the ninth transistor T9 is connected with the first signal terminal SCAN1, the first electrode of the ninth transistor T9 is connected with the second electrode of the eighth transistor T8, and the second electrode of the ninth transistor T9 is connected with the output terminal OUT.

In an exemplary embodiment, transistors T1, T5 and T7 may all be P-type thin film transistors, and transistors T2, T3, T4, T6, T8 and T9 may all be N-type thin film transistors.

It can be understood by those skilled in the art that the transistors used in all embodiments of the present disclosure may be thin film transistors or field effect transistors or other devices with the same characteristics. The thin film transistors may be oxide semiconductor thin film transistors, low-temperature polysilicon thin film transistors, amorphous silicon thin film transistors or microcrystalline silicon thin film transistors. In addition, considering that the leakage current of the low-temperature polysilicon thin film transistors is small, all transistors in the embodiments of the present disclosure may be low-temperature polysilicon thin film transistors. The thin film transistors may be thin film transistors with a bottom gate structure or thin film transistor with a top gate structure, as long as the switching function can be realized.

A working process of the pixel driving circuit in the embodiment of the present disclosure illustrated in FIG. 13 will be briefly introduced below in combination with the circuit timing diagram. Description will be made by taking transistors T1, T5 and T7 being P-type thin film transistors, and transistors T2, T3, T4, T6, T8 and T9 being N-type thin film transistors as an example.

Figure 14:
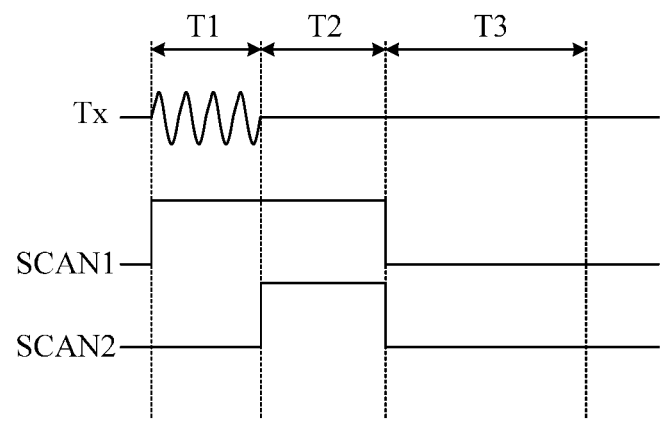
FIG. 14 illustrates a timing schematic diagram of a pixel driving circuit in an exemplary embodiment of the present disclosure.

FIG. 14 illustrates a timing diagram of a pixel driving circuit in an exemplary embodiment of the present disclosure. Referring to FIG. 14, the pixel driving circuit may include three stages, namely, a first stage T1, a second stage T2 and a third stage T3. The first stage T1 may be called a pixel charging and ultrasonic transmission stage, the second stage T2 may be called a writing compensation and echo acquisition stage, and the third stage T3 may be called a pixel luminescence stage. The first power supply terminal VDD provides a continuous high-level signal, the second power supply terminal VSS provides a continuous low-level signal, and the fourth power supply terminal Vint provides a resetting voltage signal.

Figure 15:
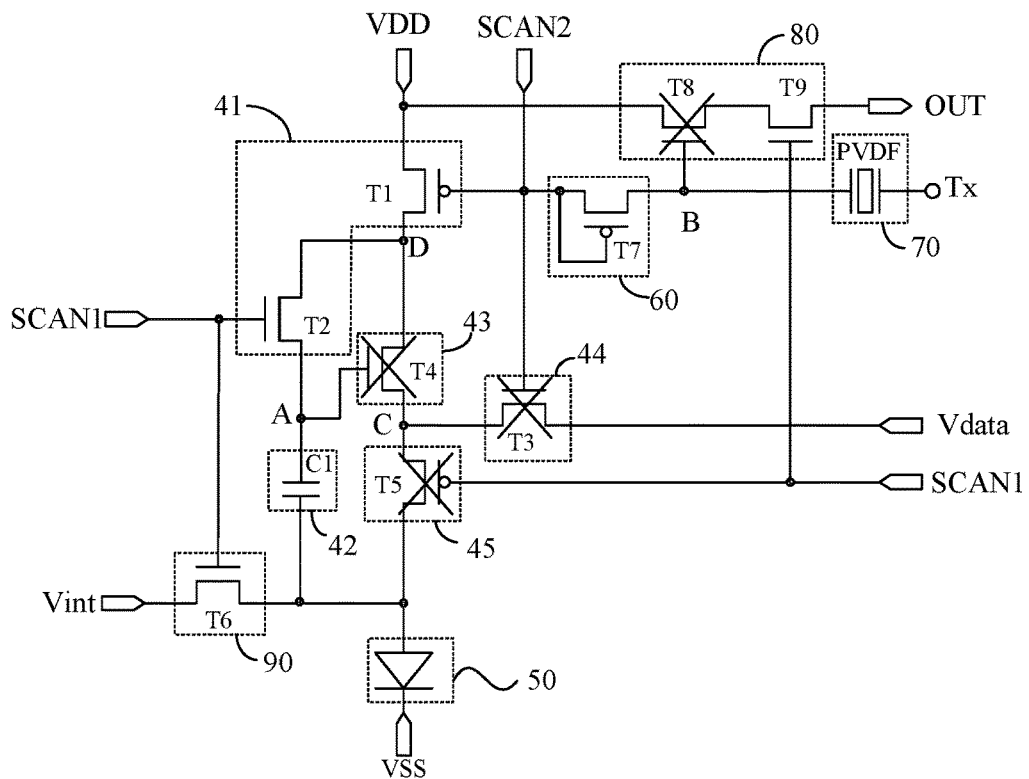
FIG. 15 illustrates a schematic diagram of a state of a pixel driving circuit in a first stage in an exemplary embodiment of the present disclosure.

In the first stage T1, TX is an alternating voltage, the signal of the first signal terminal SCAN1 is a high-level signal, and the signal of the second signal terminal SCAN2 is a low-level signal. FIG. 15 illustrates a schematic diagram of a state of a pixel driving circuit in the first stage in an exemplary embodiment of the present disclosure.

Referring to FIG. 15, in the first stage T1, SCAN1 is at a high level, the sixth transistor T6 is on, the sixth transistor T6 provides the resetting voltage signal of the fourth power supply terminal Vint to the first electrode of the light-emitting device OLED and the second electrode plate (i.e., lower electrode plate) of the storage capacitor C1, and the light-emitting device OLED does not emit light. The first transistor T1 and the second transistor T2 are on, and the charging unit 41 provides the high-level signal of the first power supply terminal VDD to the second node A through the fourth node D to charge the storage capacitor C1. The voltage of the second node A continuously increases with the increase of the charging time. When the voltage of the second node A, that is, the voltage of the control electrode of the fourth transistor T4, is lower than the threshold voltage Vth, the fourth transistor T4 is off. When the voltage of the second node A, that is, the voltage of the control electrode of the fourth transistor T4, is higher than or equal to the threshold voltage Vth, the fourth transistor T4 is on. FIG. 15 illustrates a state when the fourth transistor T4 is off. The third transistor T3 is off under the low-level signal of the second signal terminal SCAN2, and the fifth transistor T5 is off under the high-level signal of the first signal terminal SCAN1.

Referring to FIG. 15, the second signal terminal SCAN2 is at a low level, the seventh transistor T7 is on to provide the low-level signal of the second signal terminal SCAN2 to the first node B, and the signal of the first node B is a low-level signal. Tx is an alternating voltage, and the ultrasonic sensing unit 70 transmits ultrasonic waves outwards under the control of the first node B and the third power supply terminal Tx. The signal of the first node B is a low-level signal and the eighth transistor T8 is off; the signal of the first signal terminal SCAN1 is a high-level signal and the ninth transistor T9 is on, but the output terminal OUT does not output a signal since the eighth transistor T8 is off.

Figure 16:
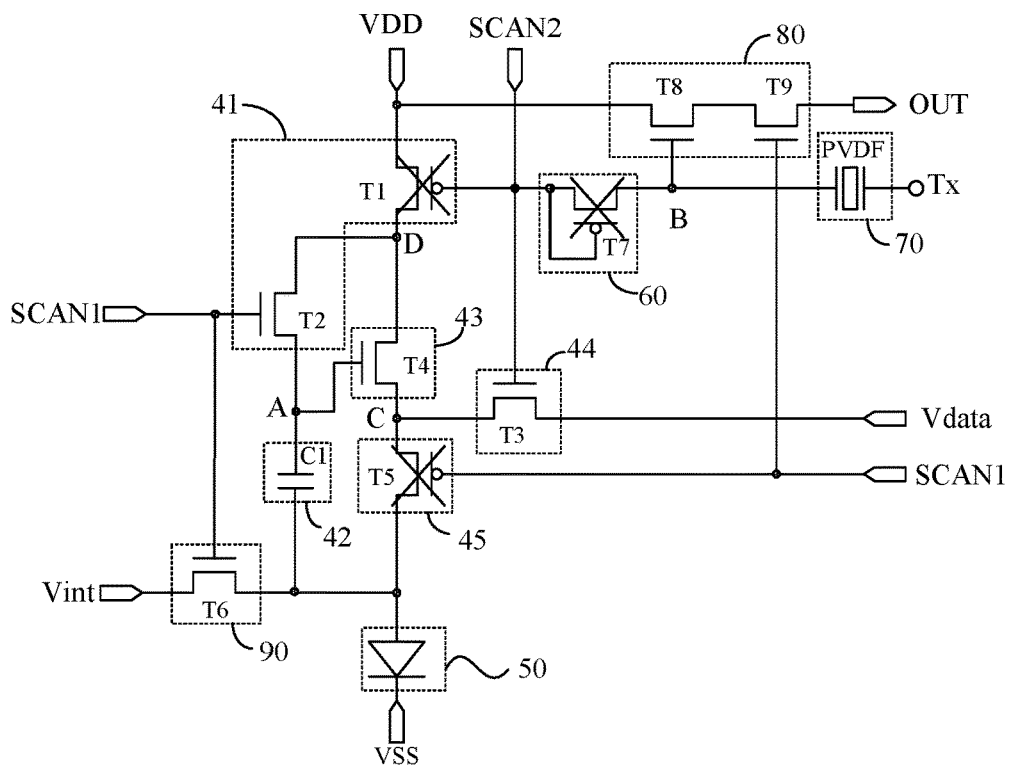
FIG. 16 illustrates a schematic diagram of a state of a pixel driving circuit in a second stage in an exemplary embodiment of the present disclosure.

In the second stage T2, Tx is a stable voltage, the signal of the first signal terminal SCAN1 is a high-level signal, and the signal of the second signal terminal SCAN2 is a high-level signal. FIG. 16 illustrates a schematic diagram of a state of a pixel driving circuit in a second stage in an exemplary embodiment of the present disclosure.

Referring to FIG. 16, the first transistor T1 is off and the fifth transistor T5 is off. The third transistor T3 is on and provides the data signal of the data input terminal Vdata to the third node C. The voltage of the second node A reaches the threshold voltage Vth, the fourth transistor T4 is on, and the data signal of the third node C is provided to the second node A to compensate the voltage of the second node A to increase the voltage of the second node A to Vth+Vdata.

Referring to FIG. 16, the seventh transistor T7 is off and the ninth transistor T9 is on. Tx is a continuous stable voltage. At this time, the ultrasonic sensing unit 70 receives the reflected ultrasonic echoes and generates an induced voltage at the first node B. Under the control of the induced voltage of the first node B, the eighth transistor T8 is on. The induced voltage of the first node B can control the on degree of the eighth transistor T8, so that the eighth transistor T8 outputs a second induced signal to the output terminal OUT.

In the third stage T3, Tx is a stable voltage, the signal of the first signal terminal SCAN1 is a low-level signal, and the signal of the second signal terminal SCAN2 is a low-level signal. FIG. 17 illustrates a schematic diagram of a state of a pixel driving circuit in a third stage in an exemplary embodiment of the present disclosure.

Referring to FIG. 17, the second transistor T2 and the sixth transistor T6 are off. The third transistor T3 is off. The first transistor T1 is on, the fourth transistor T4 is on, and the fifth transistor T5 is on. The first power supply terminal VDD and the second power supply terminal VSS are on through the first transistor T1, the fourth transistor T4, the fifth transistor T5 and the light-emitting device OLED to drive the light-emitting device OLED to emit light.

In the third stage, the voltage Vg of the control electrode of the fourth transistor T4 is equal to Vdata+Vth, that is, Vg=Vdata+Vth. Those skilled in the art can understand that in view of the characteristics of the transistor, there is a small difference between Vs and Vint, which may be ignored here.

Therefore, the voltage Vs of the second electrode (the electrode connected to the third node C) of the fourth transistor T4 is equal to Vint. Then, the current flowing through the light-emitting device OLED may be:

$$I = W*C*u/(2*L)*(Vgs-Vth)^2$$

$$Vgs = Vg - Vs = Vdata + Vth - Vint$$

Therefore, the current flowing through the light-emitting device OLED may be:

$I=W*C*u/(2*L)*(Vdata-Vint)^2$, where W/L is a width-to-length ratio of an active layer of the fourth transistor T4, C is a gate oxide capacitance per unit area, and u is a mobility of the fourth transistor T4.

Referring to FIG. 17, the seventh transistor T7 is on and provides the low-level signal of the second signal terminal SCAN2 to the first node B. The first node B is at a low level, so that the eighth transistor T8 is off. Since the third power supply terminal Tx is a continuous stable voltage, the ultrasonic sensing unit 70 will not transmit ultrasonic waves outwards. The ninth transistor T9 is off.

After the third stage T3, the pixel driving circuit maintains the state in the third stage T3 until arrival of the next first stage T1.

FIG. 18 illustrates a schematic diagram of a driving method of a pixel driving circuit in an exemplary embodiment of the present disclosure. In another aspect, the present disclosure further provides a driving method of a pixel driving circuit, which may be applied to the pixel driving circuit described above. Referring to FIG. 18, the pixel driving circuit may include three stages, namely, a first stage T1, a second stage T2 and a third stage T3. The first stage T1 may be called a pixel charging and ultrasonic transmission stage, the second stage T2 may be called a writing compensation and echo acquisition stage, and the third stage T3 may be called a pixel luminescence stage.

In the first stage T1, a signal of the first power supply terminal VDD is provided to the second node A, a signal of the second signal terminal SCAN2 is provided to the first node B, and the ultrasonic sensing unit transmits ultrasonic waves. For example, this act may include the following operations: under the control of the first signal terminal SCAN1 and the second signal terminal SCAN2, the charging unit 41 provides the signal of the first power supply terminal to the second node A through the fourth node D to charge the storage unit 42; under the control of the second signal terminal SCAN2, the ultrasonic driving unit 60 provides the signal of the second signal terminal SCAN2 to the first node B, and the ultrasonic sensing unit transmits ultrasonic waves according to the signals of the first node B and the third power supply terminal Tx.

In the second stage T2, a signal of the data input terminal Vdata is provided to the third node C to compensate a voltage of the second node A; the reflected ultrasonic echoes are received and a first induction signal is generated at the first node B; under the control of the first induction signal of the first node B, a second induction signal is output to the output terminal. For example, this act may include the following operations: under the control of the second signal terminal SCAN2, the writing unit 44 provides the signal of the data input terminal Vdata to the third node C (that is, writes a data voltage to the third node C) to compensate the voltage of the second node A; the ultrasonic sensing unit receives the reflected ultrasonic echoes and generates an induced voltage at the first node B, and the signal acquisition unit 80 outputs a second induced signal to the output terminal OUT under the control of the induced voltage at the first node B.

In the third stage, the first power supply terminal VDD and the second power supply terminal VSS are on through the charging unit, the driving unit, the control unit and the light-emitting unit. For example, this act may include the following operations: under the control of the second signal terminal SCAN2 and the first signal terminal SCAN1, the first transistor T1 in the charging unit 41 is on, the second transistor T2 is off, and the first power supply terminal VDD and the fourth node D are on; under the control of the second node A, the control unit 43 is on, so that the fourth node D and the third node C are on; under the control of the first signal terminal SCAN1, the control unit 45 is on, so that the third node C and the first electrode of the light-emitting unit 50 are on. Thus, the first power supply terminal VDD and the second power supply terminal VSS are on through the charging unit, the driving unit, the control unit and the light-emitting unit to drive the light-emitting unit to emit light.

In an exemplary embodiment, the driving method may further include the following act: in the first stage T1, the signal of the fourth power supply terminal Vint is provided to the first electrode of the light-emitting unit. For example, this act may include the following operations: under the control of the first signal terminal SCAN1, the resetting unit 90 provides the signal of the fourth power terminal Vint to the first electrode of the light-emitting unit 50 to reset the first electrode of the light-emitting unit 50.

In another aspect, the present disclosure further provides a display panel, which includes a plurality of the pixel driving circuits described above.

In an exemplary embodiment, the display panel may be any product or component having a display function, such as an OLED display panel, a mobile phone, a tablet computer, a television, a display, a notebook computer, a digital photo frame, a navigator.

Although the embodiments disclosed in the present disclosure are described as above, the contents described are only embodiments adopted for the convenience of understanding the present disclosure and are not used to limit the present disclosure. Any person skilled in the art to which the present disclosure belongs may make any modification and change in the form and details of implementation without departing from the spirit and scope disclosed in the present disclosure. However, the scope of protection of the present disclosure shall still be subject to the scope defined in the appended claims.

What is claimed is:

1. A pixel driving circuit, comprising a pixel driving module, an ultrasonic driving unit, an ultrasonic sensing unit and a signal acquisition unit, wherein
    the pixel driving module is respectively connected with a first power supply terminal, a first signal terminal, a second signal terminal, a data input terminal and a first electrode of a light-emitting unit, and is configured to provide a driving signal to the first electrode of the light-emitting unit according to signals of the first power supply terminal and the data input terminal under control of the first signal terminal and the second signal terminal;
    the ultrasonic driving unit is respectively connected with the second signal terminal and a first node, and is configured to provide a signal of the second signal terminal to the first node under control of the second signal terminal;
    a first electrode of the ultrasonic sensing unit is connected with the first node, and a second electrode of the ultrasonic sensing unit is connected with a third power supply terminal;
    the ultrasonic sensing unit is configured to transmit ultrasonic waves according to signals of the first node and the third power supply terminal, receive reflected ultrasonic echoes and generate a first induction signal at the first node; and
    the signal acquisition unit is respectively connected with the first power supply terminal, the first node and an output terminal, and is configured to output a second induction signal to the output terminal according to the first power supply terminal and the first induction signal under control of the first induction signal of the first node.

2. The pixel driving circuit according to claim 1, wherein the pixel driving module comprises a charging unit, a storage unit, a writing unit, a driving unit and a control unit, wherein
    the charging unit is respectively connected with the first power supply terminal, the first signal terminal, the second signal terminal, a second node and a fourth node; the charging unit is configured to provide a signal of the first power supply terminal to the second node through the fourth node under control of the first signal terminal and the second signal terminal; and the charging unit is further configured to provide the signal of the first power supply terminal to the fourth node under control of the first signal terminal and the second signal terminal;
    a first electrode of the storage unit is connected with the second node, and a second electrode of the storage unit is connected with the first electrode of the light-emitting unit; and the storage unit is configured to store a signal of the second node;
    the writing unit is respectively connected with the second signal terminal, the data input terminal and a third node, and is configured to provide a signal of the data input terminal to the third node under control of the second signal terminal;
    the driving unit is respectively connected with the second node, the fourth node and the third node, the driving unit is configured to provide a signal of the third node to the second node under control of the second node, and the driving unit is further configured to make the fourth node and the third node be on under control of the second node; and
    the control unit is respectively connected with the third node, the first signal terminal and the first electrode of the light-emitting unit, and is configured to make the third node and the first electrode of the light-emitting unit be on under control of the first signal terminal.

3. The pixel driving circuit according to claim 1, further comprising a resetting unit, wherein the resetting unit is respectively connected with the first signal terminal, a fourth power supply terminal and the first electrode of the light-emitting unit, and the resetting unit is configured to provide a signal of the fourth power supply terminal to the first electrode of the light-emitting unit under control of the first signal terminal.

4. The pixel driving circuit according to claim 2, wherein the charging unit comprises a first transistor and a second transistor, wherein
    a control electrode of the first transistor is connected with the second signal terminal, a first electrode of the first transistor is connected with the first power supply terminal, and a second electrode of the first transistor is connected with the fourth node;

a control electrode of the second transistor is connected with the first signal terminal, a first electrode of the second transistor is connected with the fourth node, and a second electrode of the second transistor is connected with the second node.

5. The pixel driving circuit according to claim 2, wherein the writing unit comprises a third transistor, a control electrode of the third transistor is connected with the second signal terminal, a first electrode of the third transistor is connected with the data input terminal, and a second electrode of the third transistor is connected with the third node.

6. The pixel driving circuit according to claim 2, wherein the driving unit comprises a fourth transistor, a control electrode of the fourth transistor is connected with the second node, a first electrode of the fourth transistor is connected with the fourth node, and a second electrode of the fourth transistor is connected with the third node.

7. The pixel driving circuit according to claim 2, wherein the control unit comprises a fifth transistor, a control electrode of the fifth transistor is connected with the first signal terminal, a first electrode of the fifth transistor is connected with the third node, and a second electrode of the fifth transistor is connected with the first electrode of the light-emitting unit.

8. The pixel driving circuit according to claim 3, wherein the resetting unit comprises a sixth transistor, a control electrode of the sixth transistor is connected with the first signal terminal, a first electrode of the sixth transistor is connected with the fourth power supply terminal, and a second electrode of the sixth transistor is connected with the first electrode of the light-emitting unit.

9. The pixel driving circuit according to claim 1, wherein the ultrasonic driving unit comprises a seventh transistor, a control electrode of the seventh transistor and a first electrode of the seventh transistor are connected with the second signal terminal, and a second electrode of the seventh transistor is connected with the first node.

10. The pixel driving circuit according to claim 1, wherein the signal acquisition unit comprises an eighth transistor, a control electrode of the eighth transistor is connected with the first node, a first electrode of the eighth transistor is connected with the first power supply terminal, and a second electrode of the eighth transistor is connected with the output terminal.

11. The pixel driving circuit according to claim 10, wherein the signal acquisition unit further comprises a ninth transistor located between the eighth transistor and the output terminal, a control electrode of the ninth transistor is connected with the first signal terminal, a first electrode of the ninth transistor is connected with the second electrode of the eighth transistor, and a second electrode of the ninth transistor is connected with the output terminal.

12. The pixel driving circuit according to claim 2, further comprising a resetting unit, wherein the resetting unit comprises a sixth transistor, the charging unit comprises a first transistor and a second transistor, the storage unit comprises a storage capacitor, the writing unit comprises a third transistor, the driving unit comprises a fourth transistor, the control unit comprises a fifth transistor, the ultrasonic driving unit comprises a seventh transistor, the signal acquisition unit comprises an eighth transistor and a ninth transistor, and the light-emitting unit comprises an organic light-emitting diode, wherein a control electrode of the first transistor is connected with the second signal terminal, a first electrode of the first transistor is connected with the first power supply terminal, and a second electrode of the first transistor is connected with the fourth node;

a control electrode of the second transistor is connected with the first signal terminal, a first electrode of the second transistor is connected with the fourth node, and a second electrode of the second transistor is connected with the second node;

a control electrode of the third transistor is connected with the second signal terminal, a first electrode of the third transistor is connected with the data input terminal, and a second electrode of the third transistor is connected with the third node;

a control electrode of the fourth transistor is connected with the second node, a first electrode of the fourth transistor is connected with the fourth node, and a second electrode of the fourth transistor is connected with the third node;

a control electrode of the fifth transistor is connected with the first signal terminal, a first electrode of the fifth transistor is connected with the third node, and a second electrode of the fifth transistor is connected with a first electrode of the organic light-emitting diode;

a second electrode of the organic light-emitting diode is connected with the second power supply terminal;

a first electrode plate of the storage capacitor is connected with the second node, and a second electrode plate of the storage capacitor is connected with the first electrode of the organic light-emitting diode;

a control electrode of the sixth transistor is connected with the first signal terminal, a first electrode of the sixth transistor is connected with the fourth power supply terminal, and a second electrode of the sixth transistor is connected with the first electrode of the organic light-emitting diode;

a control electrode and a first electrode of the seventh transistor are connected with the second signal terminal, and a second electrode of the seventh transistor is connected with the first node;

a control electrode of the eighth transistor is connected with the first node, a first electrode of the eighth transistor is connected with the first power supply terminal, and a second electrode of the eighth transistor is connected with a first electrode of the ninth transistor;

a control electrode of the ninth transistor is connected with the first signal terminal, and a second electrode of the ninth transistor is connected with the output terminal; and a first electrode of the ultrasonic sensing unit is connected with the first node, and a second electrode of the ultrasonic sensing unit is connected with the third power supply terminal.

13. A driving method of a pixel driving circuit, wherein the driving method is applied to the pixel driving circuit according to claim 1, and comprises:

in a first stage, providing a signal of the first power supply terminal to a second node, providing a signal of the second signal terminal to the first node, and transmitting, by the ultrasonic sensing unit, ultrasonic waves;

in a second stage, providing a signal of the data input terminal to a third node and compensating a voltage of the second node; receiving reflected ultrasonic echoes and generating a first induction signal at the first node; outputting a second induction signal to the output terminal under control of the first induction signal of the first node; and in a third stage, conducting the first power supply terminal and a second power supply terminal through a charging unit, a driving unit, a control unit and a light-emitting unit.

14. The driving method according to claim 13, further comprising:

in the first stage, providing a signal of a fourth power supply terminal to a first electrode of the light-emitting unit.

15. A display panel, comprising a plurality of the pixel driving circuits according to claim 1.

* * * * *